Sept. 3, 1968 A. W. NICHOLSON 3,400,373

CONTROL UNIT PROCESSOR-PERIPHERAL DEVICE TRANSFERS

Filed March 29, 1965 2 Sheets-Sheet 1

United States Patent Office 3,400,373
Patented Sept. 3, 1968

3,400,373

CONTROL UNIT FOR PROCESSOR-PERIPHERAL DEVICE TRANSFERS

Albert Watson Nicholson, Kidsgrove, Stoke-on-Trent, England, assignor to English Electric-Leo-Marconi Computers Limited, London, England, a British company Filed Mar. 29, 1965, Ser. No. 443,456
Claims priority, application Great Britain, Apr. 1, 1964, 13,490/64
3 Claims. (Cl. 340—172.5)

ABSTRACT OF THE DISCLOSURE

This invention relates to a system for interconnecting a central computer and a plurality of peripheral devices such as magnetic tape units. The simplest method of constructing such a system is to make each peripheral device as nearly self-contained as possible, so that the only control information which passes between the central computer and the peripheral device is simple command and synchronising signals. However, this method involves the provision of a complete set of control circuitry in each peripheral device. The present invention provides a system wherein a common control unit is provided. This control unit is interposed between the central computer and the peripheral devices as far as control information is concerned, and also controls the flow of data through an assembly store located between the central computer and the peripheral devices. A particular function which the control unit performs is the starting up of magnetic tapes; on receiving a command from the central computer to operate a tape unit, the control unit starts up the tape unit and automatically measures off the time interval which that tape unit requires for the tape to reach the proper running speed.

Figure 1:
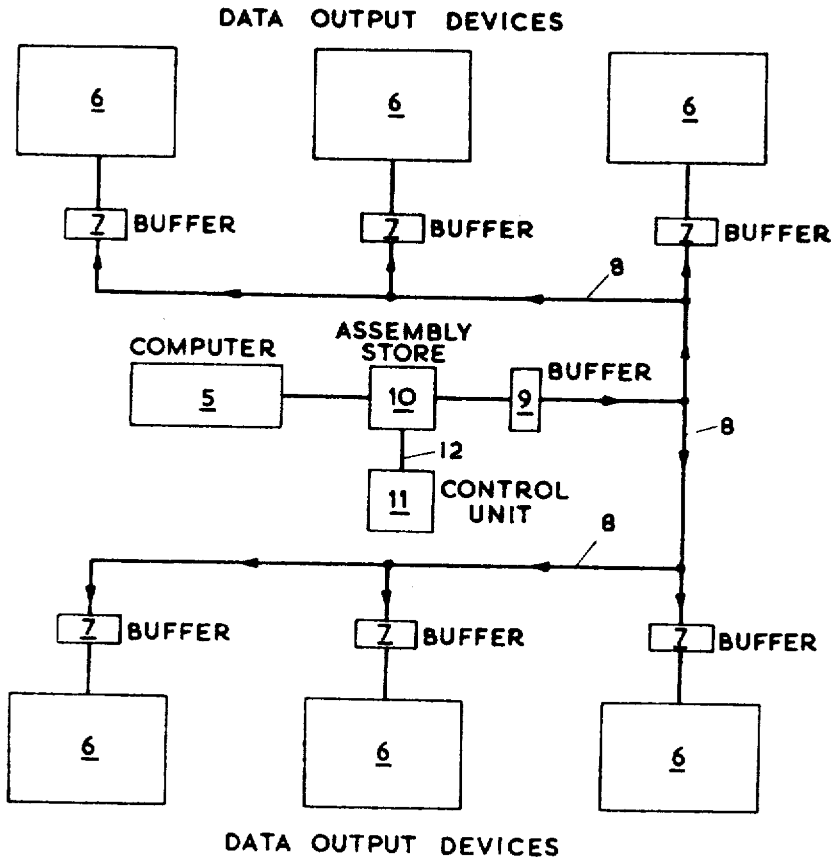

The invention relates to timing means and to data handling arrangements which may incorporate such timing means.

According to one aspect of the invention there is provided timing means for producing an output signal delayed by a predetermined amount of time after an input signal occurs, comprising storage means for storing numbers, initiating means operative when an input signal occurs for then placing a first predetermined number (which may be zero) in the storage means, counting means initiated when an input signal occurs for producing regularly occurring timing signals, the interval between two consecutive timing signals being less than the said predetermined amount of time and each said timing signal altering the said predetermined number stored in the storage means by the same predetermined amount, and output means operative when the said first predetermined number in the storage means has been altered to a second predetermined number to produce the output signal.

Advantageously, the initiating means places a different said first predetermined number in the storage means according to the length of the said predetermined amount of time required, the said second predetermined number being the same for different said predetermined amounts of time.

In an embodiment of the invention, the storage means is an electric shift register and the counting means produces regularly occurring pulses which each increases the number in the storage means by one, the output means operating by sensing the said state of a particular one of the stages in the register and produces a said output signal when the state of this stage of the register indicates that the number in the shift register is the said second predetermined number.

According to another aspect of the invention, a data handling arrangement includes a data store, a plurality of peripheral devices each arranged to receive data from, and/or to transfer data to, the data store when rendered operative after having been previously activated, connecting means interconnecting the data store with all of the peripheral devices, and control means for activating a said peripheral device and for rendering it operative at the end of a time delay beginning when the device is activated.

Advantageously, the control means includes timing means, as described above, the said time delay being equal to the said predetermined amount of time and the peripheral device being rendered operative in response to the said output signal from the timing means.

According to a feature of this aspect of the invention, the action of the peripheral device occurs in response to operation of the said initiating means.

A data handling arrangement according to this aspect of the invention may advantageously include further storage means for storing, for each peripheral device a said first predetermined number and the address of the position in the data store from which data is to be received, or to which data is to be transferred, by the peripheral device, the value of the first predetermined number stored for each peripheral device determining the length of said time delay for that peripheral device.

In an embodiment of the invention, the peripheral devices are magnetic tape units.

Each peripheral device may be associated with a respective buffer store through which the data passes, each buffer store being of sufficient size to store only data representing one character of information.

According to a further aspect of the invention, a data handling arrangement includes a data store, a plurality of magnetic tape units each arranged to receive data from the data store and detecting means for detecting the presence on the tape of blocks of data, each representing a predetermined number of characters and for detecting gaps between such blocks of data, the detecting means comprising a bistable device arranged to receive first pulses each of which is produced in response to reading of the character on the tape, each such first pulse setting the bistable device into a particular one of its bistable states or holding it thus if it is already in this state, and arranged to receive second pulses which are produced at regular intervals so related to the rate at which data is recorded on the tape as to represent a length of time corresponding to a said gap between two blocks of data, each second pulse setting the bistable device into the opposite state or holding it thus if it is already in that state, and means arranged to produce a signal indicating the presence of a gap between two blocks of data, if during reading of the data from the tape the bistable device remains in the said one of its stable states for a length of time greater than one of the said intervals between the second pulses.

Figure 2:
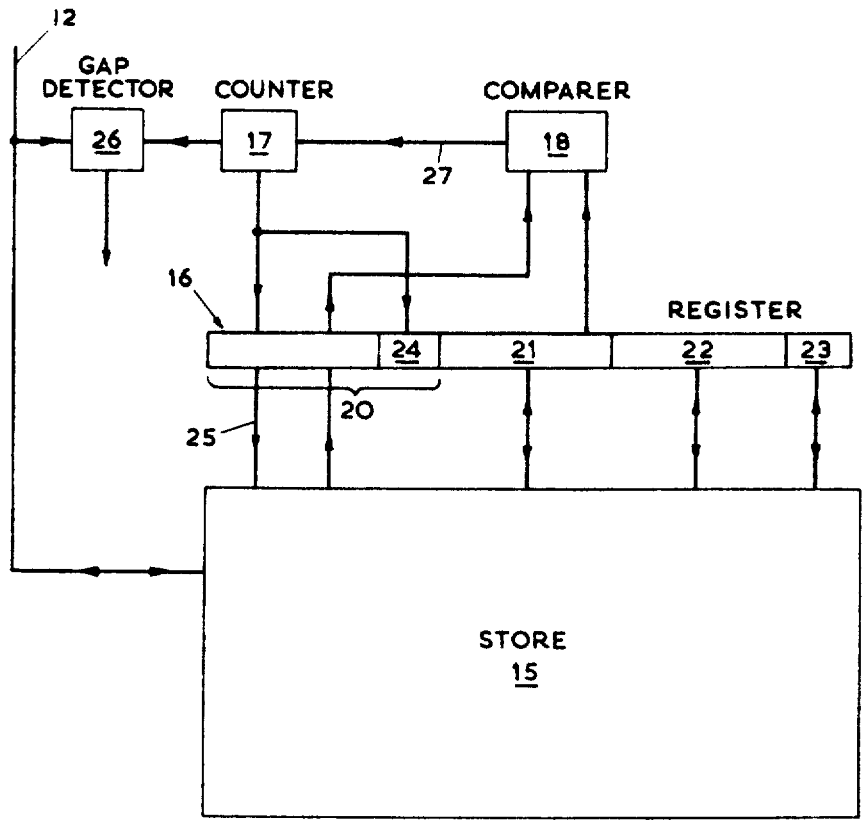

A data handling arrangement embodying the invention and incorporating a computer, having a data store, and a plurality of peripheral data output devices in the form of magnetic tape recording units operative to receive data from the data store, will now be described by way of example and with reference to the accompanying drawings in which:

FIG. 1 shows schematically the data handling arrangement in block diagram form; and FIG. 2 shows part of the arrangement in greater detail in block diagram form.

FIG. 1 shows the computer 5, which operates with a binary code, and six peripheral data output devices 6 which are magnetic tape recording units. Each tape unit has associated with it a buffer store 7 which is of sufficient size to accommodate the number of binary data bits making up one character (in this case 8 bits). The buffers 7 are connected by a feeder cable 8 to a common character buffer 9. The latter is connected to an assembly store 10 which receives information from the computer 5 which is to be recorded by the magnetic tape units 6. The transfer of data to the magnetic tape units 6 is controlled in a manner to be described by a peripheral operation control unit 11 connected to the assembly store 10 by a cable link 12.

FIG. 2 shows the peripheral operation control unit 11 in greater detail. All the items shown in FIG. 2 are part of the unit 11 but are shown separately for clarity.

The unit 11 comprises a store 15, a shift register 16, a counter 17, and a comparer unit 18. The register 16 has four separate portions referenced 20, 21, 22 and 23. The portion 20 has a subsidiary section 24 which is connected to receive stepping pulses from the counter 17. The portion 20 also receives stepping pulses from the counter 17.

The various portions of the register 16 are connected to the store 15 of the unit 11, and the comparer unit 18 is connected to receive signals representing the states of the stages in the portions 20 and 21 of the register 16. A line 25 connects a particular stage of the portion 20 of the register 16 to the store 15 and activates the store in a manner to be described when this stage is in a particular one of its two states. A detecting unit 26, the purpose of which will be explained below, is connected to reecive pulses from the counter 17 and pulses from the magnetic tape unit 6 by means of the cable link 12. The comparer unit 18 is linked to the counter 17 by a line 27.

The store 15 of the control unit 11 is divided into sections (not shown), one for each magnetic tape unit 6, each of which sections contains the initial address and final address of that portion of the data store in the computer 5 from which data is to be transferred to the particular magnetic tape unit 6.

The operation of the arrangement will now be described, it being assumed that data is to be transferred from the computer 5 to one of the magnetic tape units 6. When the programme of the computer 5 indicates that data is to be transferred to a particular magnetic tape unit, a signal from the computer, passed through the assembly store 10 and the link 12, causes the store 15 of the control unit 11 to transfer from its section corresponding to the particular magnetic tape unit 6 to the register 16 the initial and final addresses of the portion of the store in the computer holding the data to be transferred. The initial address is transferred to the portion 22 of the register 16 and the final address in the portion 21. At the same time, a predetermined number, stored in the same section in the store 15, is transferred into the portion 20 of the register.

The transfer of the predetermined number into the portion 20 causes the magnetic tape unit 6 to be automatically started up, that is, its recording tape is caused to accelerate from a standstill towards normal running speed. The pulses from the counter 17 then step the portion 20 of the register 16 on from the predetermined number initially inserted into it. When the number in the portion 20 of the register has been stepped on to such value that a particular stage in it contains a "1" bit, then a signal is generated on the line 25 causing the store 15 of the unit 11 to clear the portion 20 of the register and to feed the initial address, already in the portion 22 of the register, into the portion 20. The signal generated on the line 25 indicates that sufficient time has elapsed from the starting up of the magnetic tape unit 6 for the tape to have reached normal running speed; therefore the signal also indicates that transfer of the data from the addressed portion in the store in the computer 5 to the magnetic tape unit 6 may begin and initiates such transfer.

The data is taken from the data store in the computer one character at a time. When data transfer is initiated, the first character in the initially addressed word location in the data store is passed to the assembly store 10.

The counter 17, which is continuously operating, then sets the subsidiary section 24 of the portion 20 of the register 16 on by a count of one and causes the second character to be transferred from the initially addressed word location to the assembly store 10. The procedure is repeated for the following characters and as each character is transferred, the number in the subsidiary section 24 is increased by one. When the forty-eight characters (that is, the complete word) have been transferred from the initially addressed location, the section 24 has been stepped forty-eight times and the next pulse from the counter 17 to the section 24 of the portion 20 is arranged to cause the address in the portion 20 to increase by one so that the next word location in the store of the computer 5 is addressed and the data therein is transferred character by character to the assembly store 10. Again, as each character in this second word is transferred, the section 24 receives a stepping pulse from the counter 17: when the section 24 has received forty-eight further stepping pulses, the address in the portion 20 is increased by one so that the third word location is addressed. This process is repeated until the comparing unit 18 detects that the address in the portion 20 of the register 16 is the same as the final address stored in the portion 21, thus indicating that all the data required has been transferred to the magnetic tape unit. The counter is then stopped by a signal on line 27 and data transfer operations cease.

The portion 23 of the register 16 monitors the operation of the arrangement. It is arranged to store a number, in binary form, which represents the particular mode of operation of the arrangement, for example, the mode of operation in which a tape unit is being run up to normal speed or the mode of operation in which data is being transferred to the unit 6.

Each character transferred from the data store of the computer 5 is assembled in the assembly store 10 and then passed to the common character buffer 9; from thence the character is passed to the character buffer 7 associated with the particular magnetic tape unit 6 which is to receive the data, and the character is then transferred onto the magnetic tape.

It will be appreciated that different magnetic tape units may take different times to attain normal running speed and thus different times must elapse from the instant when the tape is set in motion and the time when data transfer can begin. Any difference in this respect between magnetic tape units is taken into account by arranging for the different sections of the store 15 of the unit 11 to store different numbers for transfer to the portion 20 of the register 16 when the tape units are selected. Thus, if a tape unit has a short delay time, that is, it can accelerate its tape up to speed in a short time, a relatively high number will be stored in the appropriate section of the store 15 and will be transferred to the portion 20 when the tape unit is selected. A relatively short time will therefore elapse before the counter 17 has stepped the stages of the portion 20 of the register to the value necessary to generate the signal on the line 25 for initiating data transfer. A relatively low number will be stored in the appropriate section of the store 15 for a tape unit with a long delay time.

The provision of buffers which are only large enough to accommodate one character at a time is advantageous in that it enables the size of the buffers to be reduced. The use of a centralised counter for controlling the initiation of data transfer to individual tape units, instead of a separate counter for this purpose at each buffer 7, enables a further reduction in buffer size to be achieved.

The store 15 can transfer data to the units 6 at a rate equal to, or greater than, *n* times the rate at which each unit 6 can receive data where *n* is the number of peripheral devices (*n* being six in this case). Data may therefore be sent to the units 6 on a time-sharing basis. The rate of scanning is such that all the units 6 are scanned during the interval between consecutive pulses from the counter 17. As each unit 6 is scanned, the particular predetermined number stored in the appropriate section of the store 15 is selected, transferred to the portion 20 of the register to cause the unit to start up and then restored in the store 15. In this way, all the units 6 are started up. When the scanning cycle repeats, each predetermined number is selected again and transferred to the portion 20 of the register where it is increased by one by the pulse from the counter 17. The increased number is then restored in the store 15. The procedure is repeated and eventually data transfer to all the tape units will have been initiated. Scanning of the units continues and the addresses of word locations appropriate to each unit are inserted into the register in turn, where they are used to control data transfer, and then restored in the store 15. As data transfer to each unit is completed, it is shut down.

The gap detecting unit 26 is used for distinguishing between blocks of data on the tape at a particular magnetic tape unit and gaps between the data, and its operation will now be described. It is arranged to treat a given number of consecutive characters as representing a block of data while absence of characters for a given length of tape indicates a gap. The tape unit has a reading head for producing pulses whenever the tape moving past the head carries a recorded character.

The detecting unit 26 is basically a bistable circuit. The counter 17 is arranged to generate pulses for operating the bistable circuit, these pulses occurring at a rate equal to half the rate at which characters are read from the tape. Each pulse from the counter 17 sets the bistable circuit to one stable state. The unit 26 also receives pulses on the cable link 12, from the magnetic tape unit, each such pulse occurring coincidentally with passage of a character on the tape past the reading head. These pulses set the bistable circuit in the opposite stable state. If the bistable circuit, initially set in one stable state by one of the pulses from the counter 17, is still in the same state on occurrence of the next pulse from the counter 17 indicating that no character on the tape has been detected during the elapsed time, then the unit 26 is arranged to indicate the presence of a gap between data on the tape. If the bistable circuit is switched to the opposite stable state in between receipt of two successive pulses from the counter 17, then the unit 26 indicates the presence of a block of data.

In the data handling arrangement described, the magnetic tape units 6 are data output devices, that is, devices operative to receive data from the data store of the computer. In an alternative arrangement embodying the invention, however, the magnetic tape units 6 are data input devices, that is, devices operative to transfer data to the data store of the computer. In such an arrangement, the peripheral control unit 11 starts up each tape unit 6 when the unit has data to transfer to particular addressed locations of the data store and the counter 17 and register 16 operate, in a manner similar to that described, to allow data transfer to begin only when sufficient time has elapsed for the magnetic tape unit to have reached normal running speed.

The invention may be used with other peripheral devices, and is particularly advantageous when used with peripheral devices which, like magnetic tape units, cannot operate satisfactorily immediately they are switched on but require a period to reach normal operation.

What I claim as my invention and desire to secure by Letters Patent is:

1. Apparatus for controlling the operation of a plurality of peripheral devices in relation to a central computer, the computer being arranged to select desired ones of the peripheral devices and at least some of the peripheral devices requiring to remain in a transitional state for respective predetermined time intervals after selection before entering an active state in which data can be transferred, th apparatus comprising: storage means adapted to store, for each peripheral device, control data including an activation time count having an initially predetermined value and a state indicator indicative of the operative state of the peripheral device; means for scanning all peripheral devices in turn at a constant rate; means operative in response to the scanning of a selected peripheral device for temporarily extracting the associated control data from the storage means; and control data updating means operative on control data extracted from the storage means to increment the activation time count if the state indicator indicates that the peripheral device is in the transitional state and to change the state indicator to indicate that the peripheral device is in the active state if the activation time count has reached a predetermined value.

2. Apparatus according to claim 1, wherein said control data also includes the addresses, in the central computer, of the first and last words of the data being transferred between the central computer and the peripheral device associated with the relevant control data, and the apparatus includes address registers adapted to receive said addresses when the control data is read out of the storage means.

3. Apparatus according to claim 1, wherein each peripheral device includes buffer means capable of storing only a single character of a multicharacter word, and the apparatus also includes means for assembling successive characters received from a peripheral device into a word and for disassembling a word into characters successively transmitted to a peripheral device, a word in the course of assembly or disassembly being stored in a part of said storage means associated with the peripheral device to or from which the characters are being transmitted.

References Cited

UNITED STATES PATENTS 3,153,775 10/1964 Marsh ------------ 340—172.5

ROBERT C. BAILEY, *Primary Examiner.*

I. S. KAVRUKOV, *Assistant Examiner.*